United States Patent [19]
Yamawaki

[11] Patent Number: 6,104,520
[45] Date of Patent: Aug. 15, 2000

[54] LASER SCANNING OPTICAL SYSTEM AND IMAGE FORMING APPARATUS USING THE SAME

[75] Inventor: Takeshi Yamawaki, Tokyo, Japan

[73] Assignee: Canon Kabushiki Kaisha, Tokyo, Japan

[21] Appl. No.: 09/172,168

[22] Filed: Oct. 14, 1998

[30] Foreign Application Priority Data

Oct. 17, 1997 [JP] Japan .................................. 9-303789
Jan. 9, 1998 [JP] Japan .................................. 10-015004

[51] Int. Cl.[7] .............................. G02B 26/08; G02B 3/06
[52] U.S. Cl. .......................... 359/205; 359/206; 359/207; 359/217; 359/711
[58] Field of Search .................................. 359/205, 206, 359/207, 216, 217, 218, 219, 711, 662

[56] References Cited

U.S. PATENT DOCUMENTS 5,557,449  9/1996  Miyagawa et al. ..................... 359/217
5,774,250  6/1998  Shimada et al. ....................... 359/207

FOREIGN PATENT DOCUMENTS

3-231218  10/1991  Japan .

*Primary Examiner*—Cassandra Spyrou
*Assistant Examiner*—Fayez Assaf
*Attorney, Agent, or Firm*—Fitzpatric, Cella, Harper & Scinto

[57] ABSTRACT

A laser scanning optical system includes a light source, a polygonal mirror for deflecting a light beam emitted by the light source, and a scanning lens system for guiding the light beam deflectively reflected by the polygonal mirror to a surface to be scanned. The scanning lens system has a spherical lens, and a toric lens which is formed of a plastic material having a positive refractive power in both main scanning and sub-scanning directions. At least one surface of the toric lens has an aspherical shape which is substantially perpendicular to a light beam, which has been transmitted through the spherical lens, in a main scanning section.

18 Claims, 6 Drawing Sheets

THICKNESS (DISTANCE BETWEEN GENERATING LINES)

FIG. 5B

VARIATION RATIO TO CENTRAL THICKNESS

THICKNESS (DISTANCE BETWEEN GENERATING LINES)

FIG. 7B

VARIATION RATIO TO CENTRAL THICKNESS

LASER SCANNING OPTICAL SYSTEM AND IMAGE FORMING APPARATUS USING THE SAME

BACKGROUND OF THE INVENTION

1. Field of the Invention

The present invention relates to a laser scanning optical system and an image forming apparatus using the same and, more particularly, to a laser scanning optical system suitable for an image forming apparatus such as a laser beam printer (LBP), a digital copying machine, or the like, which uses, e.g., an electrophotography process for recording image information by deflecting and reflecting a light beam (laser beam) emitted by a light source means comprising a semiconductor laser using-a light deflector comprising a rotary polygonal mirror (polygon mirror), and then scanning the light beam on the surface to be scanned via a scanning lens system (f-θ lens) having f-θ characteristics.

2. Related Background Art

Figure 1:
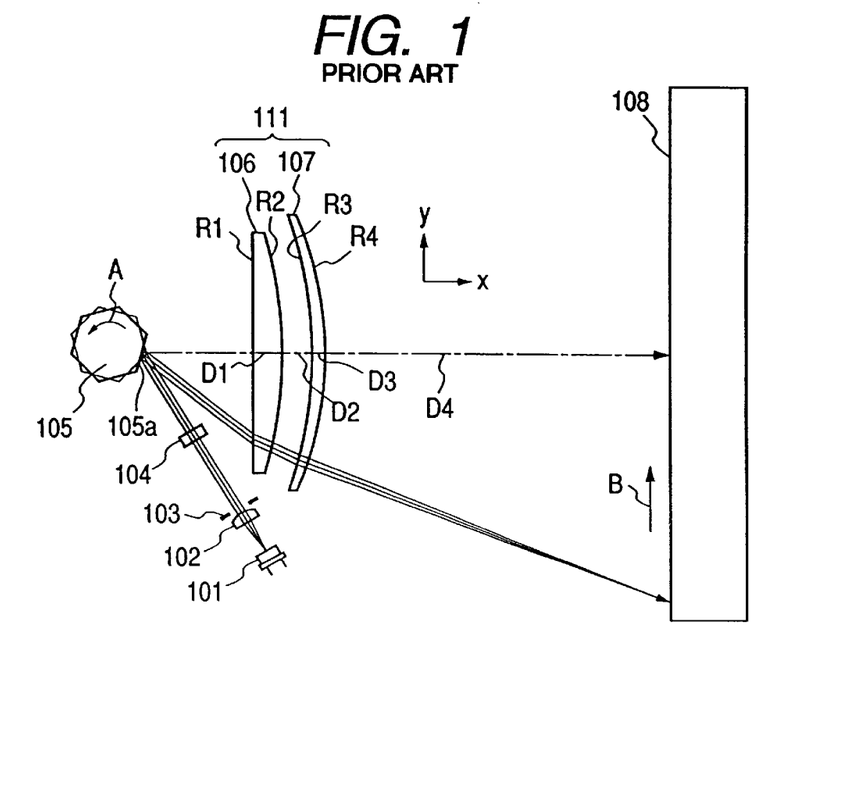
FIG. 1 is a main scanning sectional view of a conventional scanning optical system.
Figure 2:
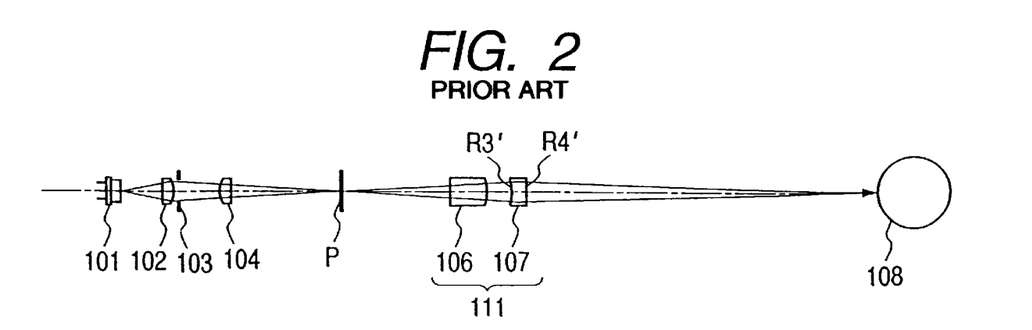
FIG. 2 is a sub-scanning sectional view of the conventional scanning optical system.

Conventionally, for example, as shown in Japanese Patent Application Laid-Open No. 3-231218, proposed a laser scanning optical system periodically deflects a light beam emitted by a light source means by a light deflector comprising, e.g., a rotary polygonal mirror, focusing the light beam into a spot shape on the surface of a photosensitive recording medium (photosensitive drum) via a scanning lens system, and scanning the light beam on that surface to record an image. FIGS. 1 and 2 are respectively a main scanning sectional view and a sub-scanning sectional view of the laser scanning optical system proposed by that reference.

In FIGS. 1 and 2, a light beam (laser beam) emitted by a light source means 101 comprising a semiconductor laser is converted into a nearly collimated light beam by a collimator lens 102, that light beam (light amount) is limited by a stop 103, and then enters a cylindrical lens 104 having a predetermined refractive power in only the sub-scanning section. The nearly collimated light beam that enters the cylindrical lens 104 leaves the cylindrical lens 104 in fact in the main scanning section. However, in the sub-scanning section, the nearly collimated light beam converges and forms a nearly line image on a deflection surface 105a of a light deflector 105 comprising a rotary polygonal mirror. The light beam deflected and reflected by the deflection surface 105a of the light deflector 105 is focused on the surface of a photosensitive drum 108 as the surface to be scanned via a scanning lens system (f-θ lens system) 111, which is comprised of a spherical lens 106 having a positive refractive power, and a toric lens (plastic toric lens) 107 formed of a plastic material having a positive refractive power in both the main scanning and sub-scanning directions. By rotating the light deflector 105 in the direction of an arrow A, the light beam scans, i.e., linearly moves at substantially equal velocity on the surface of the photosensitive drum 108 in the direction of an arrow B (main scanning direction), thus recording image information.

A numerical value example of the above-mentioned laser scanning optical system is listed below:

Focal length of scanning lens system: 188 mm
Maximum scanning angle: 90.8°
Polygon center to R1 surface: 73.93 mm

| | |
|---|---|
| R1 = 988.25 | D1 = 24 |
| | N1 = 1.51329 |
| R2 = −135.8 | D2 = 5 |
| R3m = −1334.558 | D3 = 7.5 |
| | N2 = 1.52179 |
| R3s = −42.984 | |
| R4m = −347.830 | D4 = 177.980 |
| R4s = −20.740 | |

TABLE 1

Table 1 below lists aspherical coefficients.

| | | 1 | 2 | 3 | 4 | 5 | 6 |
|---|---|---|---|---|---|---|---|
| R3m | | Ru<br>−1.33456D+03<br>R1<br>−1.33456D+03 | kyu<br>−7.31256D+02<br>ky1<br>−7.31256D+02 | B4u<br>−1.03710D−07<br>B41<br>−1.03710D−07 | B6u<br>4.81636D−12<br>B61<br>4.81636D−12 | B8u<br>−4.38844D−16<br>B81<br>−4.38844D−16 | B10<br>0.00000D+00<br>B10<br>0.00000D+00 |
| R3s | | ru<br>−4.29835D+01<br>r1<br>−4.29835D+01 | D2u<br>−6.57119D−05<br>D21<br>−5.70695D−05 | D4u<br>1.76472D−08<br>D41<br>9.39237D−09 | D6u<br>−3.10098D−12<br>D61<br>−8.47573D−13 | D8u<br>2.14963D−16<br>D81<br>1.35957D−17 | D10<br>0.00000D+00<br>D10<br>0.00000D+00 |
| R4m | | Ru<br>−3.47830D+02<br>R1<br>−3.47830D+02 | kyu<br>9.08635D+00<br>ky1<br>9.08635D+00 | B4u<br>0.00000D+00<br>B41<br>0.00000D+00 | B6u<br>0.00000D+00<br>B61<br>0.00000D+00 | B8u<br>0.00000D+00<br>B81<br>0.00000D+00 | B10<br>0.00000D+00<br>B10<br>0.00000D+00 |
| R4s | | ru<br>−2.07400D+01<br>r1<br>−2.07400D+01 | D2u<br>0.00000D+00<br>D21<br>0.00000D+00 | D4u<br>0.00000D+00<br>D41<br>0.00000D+00 | D6u<br>0.00000D+00<br>D61<br>0.00000D+00 | D8u<br>0.00000D+00<br>D81<br>0.00000D+00 | D10<br>0.00000D+00<br>D10<br>0.00000D+00 |

In the numerical value example, Ri is the paraxial radius of curvature of the i-th lens surface from the light deflector side, Di is the thickness and air gap of the i-th lens from the light deflector side, and Ni is the refractive index of the material of the i-th lens from the light deflector side. Also, m and s are suffices that respectively indicate the main scanning and sub-scanning directions. Furthermore, the light source wavelength is 675 nm, and the polygonal mirror is a hexahedron, which has a circumscribed circle diameter of 50 mm, and an incident deflection angle of 60°.

In Table-1, aspherical coefficients k, Bn, Dn of each order are expressed by relations of a generating line given by relations between the height y and distance x of the lens surface on an x-y plane:

Generating line:

$$X=Y^2/Ru[1+\sqrt{1-(y/Ru)^2}]+B4uY^4+B6uY^6+B8uY^8+B10uY^{10}$$

(for $Y \geq 0$)

$$X=Y^2/RL[1+\sqrt{1-(y/RL)^2}]+B4LY^4+B6LY^6+B8LY^8+B10LY^{10}$$

(for $Y<0$)

and by relations of a meridian line given by the function of lens height:

Meridian line:

$$ru'=ru(1+D2uY^2+D4uY^4+D6uY^6+D8uY^8+D10uY^{10})$$

(for $Y \geq 0$)

$$ru'=rL(1+D2LY^2+D4LY^4+D6LY^6+D8LY^8+D10LY^{10})$$

(for $Y<0$)

In the laser scanning optical system with such setups, let f2a be the focal length of the toric lens 107 in the main scanning section, and let fa be the focal length of the scanning lens system (synthesized one of the spherical lens 106 and toric lens 107) 111. Then, a laser scanning optical system which is excellent in wide field angle, high performance, size reduction, environmental-resistance-variation characteristics of a plastic lens, and cost can be realized by satisfying:

$$0.1<fa/f2a<0.3 \quad (1)$$

In the conventional laser scanning optical system, fa/f2a= 0.21, which satisfies conditional formula (1) above.

However, when the lens surface of the toric lens uses a high-order aspherical surface, as described above, the toric lens must use plastic considering its manufacturing processes and cost. However, as is well known, since a plastic lens using a plastic material is weak against heat (environmental temperature) (i.e., its characteristics change considerably), coating is hard to attain. Also, since an increase in cost resulting from coating is larger than coating of a glass lens, a non-coating plastic lens is normally molded.

In general, when the incident angle of a light beam (light rays) on the lens surface changes depending on the scanning field angle, the Fresnel reflectance changes and the lens transmittance varies. For example, let $\theta i$ and $\theta o$ be the angles before and after the light beam is refracted at each lens surface. Then, the amplitude reflectances upon incidence of p-and s-polarized light beams (laser beams) coming from a semiconductor laser on the lens (optical element) are given by:

p-component amplitude reflectance:

$$Rp=\tan(\theta i-\theta o)/\tan(\theta i+\theta o) \quad (2)$$

s-component amplitude reflectance:

$$Rs=\sin(\theta i-\theta o)/\sin(\theta i+\theta o) \quad (3)$$

The Fresnel reflectance is obtained by calculating the squares of these equations (2) and (3).

Table-2(A) and Table-2(B) below respectively show the Fresnel reflectance of the conventional non-coating toric lens, and the variation ratio-in this Fresnel reflectance at each image height (distance from the scanning center on the surface 108 to be scanned) and at each field angle upon normalization, assuming that the on-axis reflectance is unity:

TABLE 2

(A) Toric Lens Fresnel Reflectance of Prior Art

| Image Height (mm) | Field Angle (deg) | Third Surface (deg) Incident Angle $\theta 3i$ | Third Surface (deg) Exit Angle $\theta 3o$ | Fourth Surface (deg) Incident Angle $\theta 4i$ | Fourth Surface (deg) Exit Angle $\theta 4o$ | In case of p-polarized Laser Third Surface Reflectance | In case of p-polarized Laser Fourth Surface Reflectance | In case of s-polarized Laser Third Surface Reflectance | In case of s-polarized Laser Fourth Surface Reflectance |
|---|---|---|---|---|---|---|---|---|---|
| −149.1 | −45.4 | −18.82 | −12.24 | −6.0 | −9.1 | 0.037 | 0.041 | 0.049 | 0.044 |
| −114.9 | −35.0 | −18.3 | −11.9 | −6.6 | −10.1 | 0.037 | 0.041 | 0.049 | 0.045 |
| 0.0 | 0.0 | 0.3 | 0.2 | 0.4 | 0.5 | 0.043 | 0.043 | 0.043 | 0.043 |
| 114.9 | 35.0 | 18.5 | 12.0 | 6.7 | 10.3 | 0.037 | 0.041 | 0.049 | 0.045 |
| 149.1 | 45.4 | 18.2 | 11.8 | 5.5 | 8.4 | 0.037 | 0.042 | 0.049 | 0.044 |

(B) Fresnel Reflectance Variation Ratio

| Image Height (mm) | Field Angle (deg) | In case of p-polarized Laser Third Surface Reflectance | In case of p-polarized Laser Fourth Surface Reflectance | In case of s-polarized Laser Third Surface Reflectance | In case of s-polarized Laser Fourth Surface Reflectance |
|---|---|---|---|---|---|
| −149.1 | −45.4 | 0.857 | 0.967 | 1.153 | 1.034 |
| −114.9 | −35.0 | 0.864 | 0.960 | 1.145 | 1.041 |
| 0.0 | 0.0 | 1.000 | 1.000 | 1.000 | 1.000 |
| 114.9 | 35.0 | 0.862 | 0.958 | 1.147 | 1.043 |
| 149.1 | 45.4 | 0.867 | 0.972 | 1.142 | 1.029 |

As can be seen from Table-2(A) and Table-2(B), the Fresnel reflectance on the incident surface (third surface) changes with an increasing field angle, and the variation ratio in the entire scanning range reaches a maximum of approximately 15%. This produces an energy strength difference in a laser spot that scans the photosensitive drum surface, and the thickness and density of scanning lines at the central portion and two end portions of the scanning region change, thus causing the image to deteriorate.

As described above, in the conventional laser scanning optical system, when the incident angle of a light beam (light rays) on the lens surface changes depending on the scanning field angle, the Fresnel reflectance changes and the lens transmittance varies. As a result, it is hard to obtain a satisfactory image.

It is a common practice to use injection molding in the manufacture of an elongated toric lens consisting of a plastic material. The molding conditions upon injection molding roughly include parameters such as the temperature, pressure, cooling time, and the like. Hence, by optimizing these parameters, the molding conditions that can minimize birefringence and can make molding reproducibility most stable are determined.

However in injection molding, the setup lens shape largely influences its optical performance. That is, when the thickness of the lens in the optical axis direction changes in the longitudinal direction, (1) the flow upon injecting a resin from a gate (entrance) at an end portion in the longitudinal direction becomes unstable, the resin cannot flow uniformly, and the molding parameters do not effect uniformly. For this reason, the optimal conditions of the parameters slightly vary in the longitudinal direction of the lens, the redundancies of the parameters that satisfy uniform optical performance are reduced, and the controllability and yield cannot be improved. Also, the optical performance deteriorates.

(2) When the variation in thickness is large, stress is locally concentrated in the cooling process, thus producing birefringence.

(3) Furthermore, when the central thickness becomes large, it is difficult to align the orientation axes of the resin, resulting in large birefringence. For this reason, conventionally, in order to assure the required thickness of the gate portion (end portion), a large central thickness must be inevitably set.

(4) Since the imaging spot on the surface to be scanned becomes large in a lens that suffers birefringence, if such lens is used in an image forming apparatus, fine image formation cannot be done, resulting in poor image quality.

Figure 3A:
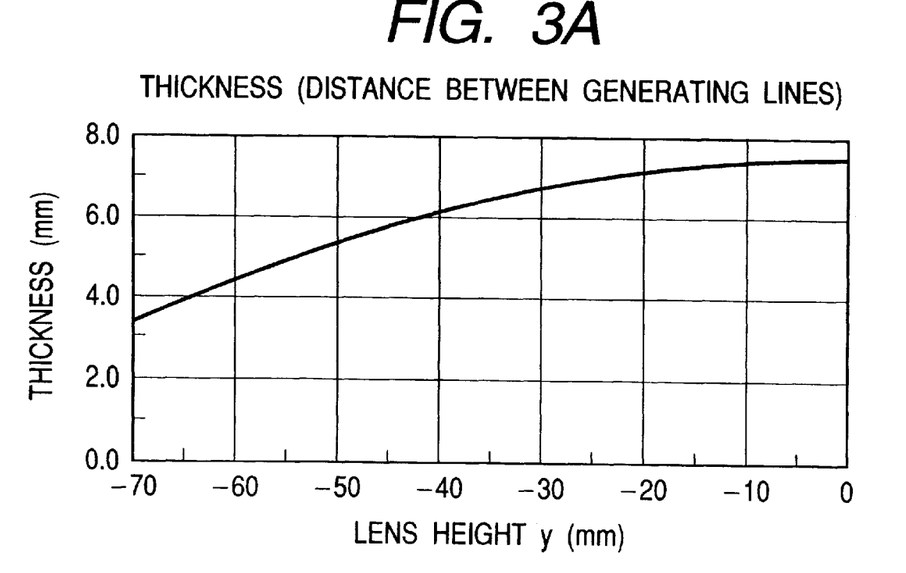
FIGS. 3A and 3B are explanatory views showing the relationship between the lens height and thickness of the conventional scanning optical system.
Figure 3B:
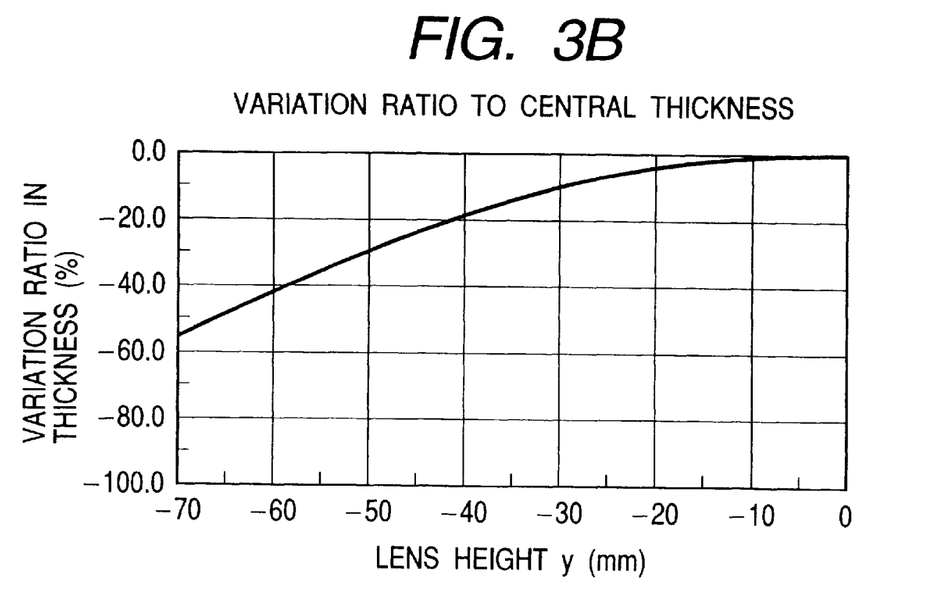

FIGS. 3A and 3B are explanatory views showing the relationship between the lens height y and thickness in the conventional toric lens 107 shown in FIGS. 1 and 2. As shown in FIGS. 3A and 3B, the thickness at the most off-axis position (lens height=70 mm) is 3.5 mm while the central thickness is 7.5 mm; the thickness has changed approximately 55.6%.

SUMMARY OF THE INVENTION

It is an object of the present invention to provide a laser scanning optical system which can prevent image deterioration resulting from changes in reflectance characteristics and can irradiate the surface to be scanned with nearly uniform light intensity (energy strength) by making at least one lens surface of a toric lens formed of a plastic material have an aspherical shape which is nearly perpendicular to a light beam transmitted through a spherical lens in the main scanning section.

It is another object of the present invention to provide a laser scanning optical system which can improve the optical performance of a molded lens by the use of a lens shape optimal to injection molding by forming a toric lens made from a plastic material to have a substantially constant thickness (the distance between generating lines) in the optical axis direction in its main scanning section.

It is still another object of the present invention to provide an image forming apparatus which can prevent deterioration of image quality and can form an image which has satisfactory thickness and density of a scanning line by performing image formation using the above-mentioned laser scanning optical system.

According to the present invention, a laser scanning optical system, which guides a light beam emitted by light source means to deflection means, guides the light beam deflectively reflected by the deflection means to a surface to be scanned by a scanning lens system, and scans the light beam on the surface to be scanned, is characterized in that the scanning lens system has a spherical lens, and a toric lens, which has a positive refractive power in both the main scanning and sub-scanning directions, and is formed of a plastic material, and at least one lens surface of the toric lens is formed by an aspherical shape which is substantially perpendicular to a light beam that is transmitted through the spherical lens in a main scanning section.

Especially, the laser scanning optical system is characterized in that the lens surface having the aspherical shape of the toric lens has substantially constant Fresnel reflectance characteristics over an entire scanning range, the spherical lens has a positive refractive power, the spherical lens is formed of a glass material, and so forth.

Also, the laser scanning optical system is characterized in that a thickness of the toric lens in an optical axis direction in the main scanning section is substantially constant, and a ratio of the distance from a deflection point of the deflection means to the surface to be scanned to a focal length of the scanning lens system falls within a range from 1.34 to 1.2.

Furthermore, the laser scanning optical system is characterized in that a variation ratio in thickness of the toric lens in an optical axis direction in the main scanning section is not more than 20% in a scanning region with reference to a central thickness on an axis, and so forth.

An image forming apparatus of the present invention is characterized by forming an image using the aforementioned laser scanning optical system.

DETAILED DESCRIPTION OF THE PREFERRED EMBODIMENTS

Figure 4:
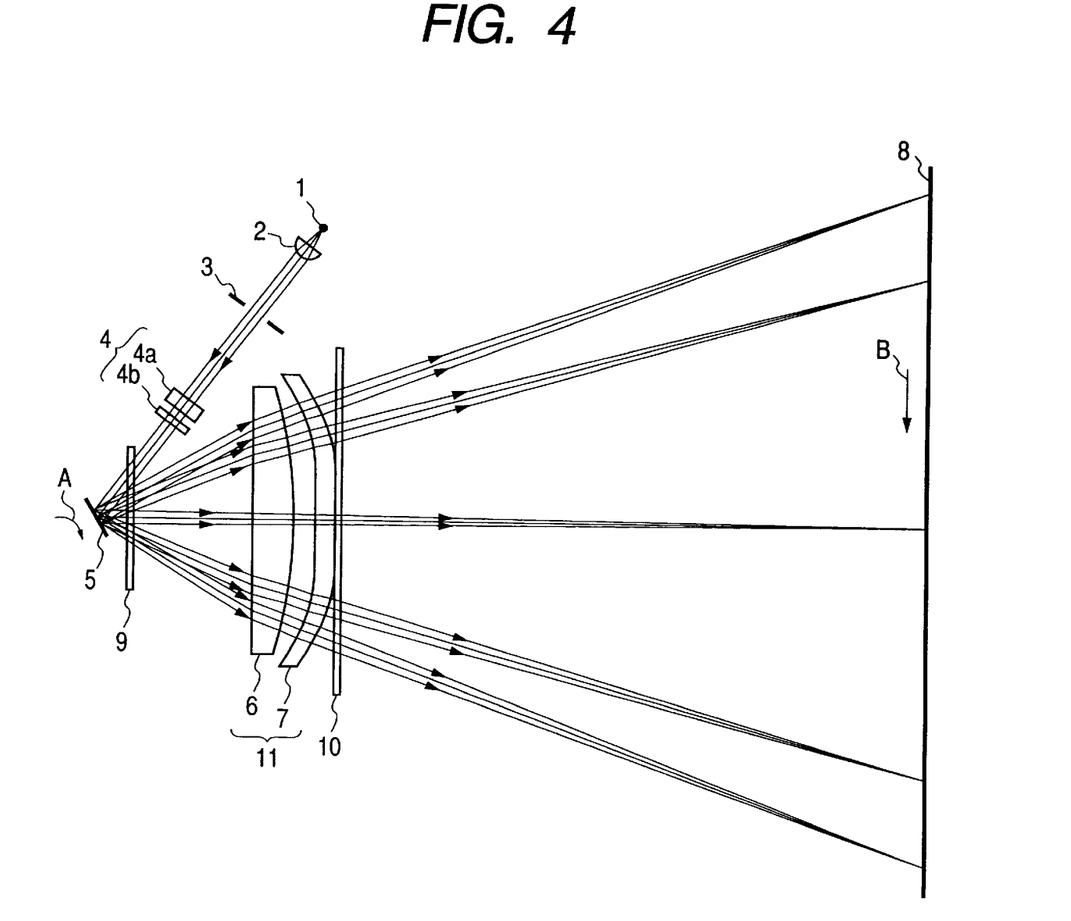
FIG. 4 is a main scanning sectional view of the first embodiment of a scanning optical system according to the present invention.

FIG. 4 is a sectional view in the main scanning direction (main scanning sectional view) when a laser scanning optical system according to the first embodiment of the present invention is applied to an image forming apparatus, such as a laser beam printer (LBP) or the like.

Referring to FIG. 4, a light source means 1 comprises, e.g., a semiconductor laser. A collimator lens 2 converts a light beam (laser beam) emitted by the light source means 1 into a nearly collimated light beam. An aperture stop (aperture) 3 limits the light beam (light amount) that passes through the aperture.

A cylindrical lens unit 4 is comprised of two lenses, i.e., a plastic lens 4a and glass lens 4b, and has a predetermined refractive power in only the sub-scanning section perpendicular to the plane of the drawing of FIG. 4. The cylindrical lens unit 4 images the light beam that has passed through the aperture stop 3 to form a nearly linear image elongated in the main scanning direction on the deflection surface of a light deflector 5 (to be described later). The cylindrical lens unit 4 cancels focus variations in the sub-scanning direction, which have arisen from environmental variations of a toric lens 7 (to be described later) formed of a plastic material. Note that the collimator lens 2, the aperture stop 3, and the cylindrical lens unit 4 are respectively constitutional elements of an incident optical means.

The light deflector 5 serving as a deflection means comprises, e.g., a rotary polygonal mirror (polygonal mirror), and is rotated at a predetermined velocity in the direction of an arrow A by a drive means (not shown) such as a motor or the like.

A scanning lens system (f-θ lens system) 11 has f-θ characteristics, and has a spherical lens 6, which has a positive refractive power and is formed of a glass material, and the toric lens (plastic toric lens) 7, which is placed on the-surface-to-be-scanned-side of the spherical lens 6, and is formed of a plastic material having a positive refractive power in both the main scanning and sub-scanning directions. Note that the toric lens 7 has no coating film.

In this embodiment, the two lens surfaces of the toric lens 7 have an aspherical shape, which is substantially perpendicular to the light beam (light rays), which is transmitted through the spherical lens 6, in the main scanning section, as described in a numerical value example to be described later, so that the light beam that has been transmitted through the toric lens 7 has nearly constant Fresnel reflectance characteristics over the entire scanning angle (the entire scanning range).

Note that "nearly constant" in this specification means that the variation ratio in Fresnel reflectance over the entire scanning range is 10% or less.

The scanning lens system 11 images a light beam based on image information, which is deflectively reflected by the deflection surface of the light deflector 5, on a photosensitive drum surface 8, and also corrects any tilt of the deflection surface of the light deflector 5.

A window glass 9 protects the light deflector (rotary polygonal mirror) 5, which is rotating a high speed, from contamination. A dustproof glass 10 protects the optical system from toner scattering from the photosensitive drum surface 8.

In this embodiment, a light beam emitted by the semiconductor laser 1 is converted into a nearly collimated light beam by the collimator lens 2, the light beam (light amount) is limited by the aperture stop 3, and then enters the cylindrical lens unit 4. The light beam that enters the cylindrical lens unit 4 leaves the lens unit 4 in fact, i.e., it stays nearly collimated in the main scanning section. On the other hand, in the sub-scanning section, the light beam converges, and forms a nearly linear image (a linear image elongated in the main scanning direction) on the deflection surface of the light deflector 5. The light beam deflectively reflected by the deflection surface of the deflector 5 is guided onto the photosensitive drum surface 8 via the scanning lens system 11 comprised of the spherical lens 6 and toric lens 7. At this time, in the main scanning section, the deflectively reflected light beam (light rays), which has been transmitted through the spherical lens 6, becomes nearly perpendicularly incident on the lens surface of the toric lens 7, and is imaged on the photosensitive drum surface 8 under the influence of the positive refractive power. By rotating the light deflector 5 in the predetermined direction, the light beam scans, i.e., linearly moves at nearly equal velocity on the photosensitive drum surface 8. With this scanning, an image is recorded on the photosensitive drum surface 8 as a recording medium.

Numerical value example 1 of this embodiment is listed below.

Focal length of scanning lens system: 270 mm

Maximum scanning angle: 64.3°

Polygon center to R1 surface: 93.08 mm

| | |
|---|---|
| R1 = 999.73 | D1 = 20 |
| | N1 = 1.51329 |
| R2 = −201.12 | D2 = 8 |
| R3m = −1673.39 | D3 = 9.4 |
| | N2 = 1.526878 |
| R3s = −66.472 | |
| R4m = −523.255 | D4 = 257.45 |
| R4s = −27.45 | |

Distance from deflection point position to image surface: 360.785 mm

TABLE 3

Table 3 below lists aspherical coefficients.

| | 1 | 2 | 3 | 4 | 5 | 6 |
|---|---|---|---|---|---|---|
| R3m | Ru<br>−1.67339D+03<br>R1<br>−1.67339D+03 | kyu<br>−2.39037D+03<br>ky1<br>−2.39037D+03 | B4u<br>−6.51740D−07<br>B41<br>−6.51740D−07 | B6u<br>−5.95738D−11<br>B61<br>−5.95738D−11 | B8u<br>7.32130D−15<br>B81<br>7.32130D−15 | B10<br>0.00000D+00<br>B10<br>0.00000D+00 |

TABLE 3-continued

Table 3 below lists aspherical coefficients.

|     |   | 1 | 2 | 3 | 4 | 5 | 6 |
|---|---|---|---|---|---|---|---|
|     |   | ru | D2u | D4u | D6u | D8u | D10 |
| R3s | ⌈ | −6.64719D+01 | 0.00000D+00 | 0.00000D+00 | 0.00000D+00 | −1.14176D−14 | 2.31489D−18 |
|     |   | rl | D21 | D41 | D61 | D81 | D10 |
|     | ⌊ | −6.64719D+01 | 0.00000D+00 | 0.00000D+00 | 0.00000D+00 | −1.14176D−14 | 2.31489D−18 |
|     |   | Ru | kyu | B4u | B6u | B8u | B10 |
| R4m | ⌈ | −5.23255D+02 | 4.44285D+01 | −4.79575D−07 | −5.54604D−11 | 6.09421D−15 | 0.00000D+00 |
|     |   | Rl | kyl | B41 | B61 | B81 | B10 |
|     | ⌊ | −5.23255D+02 | 4.44285D+01 | −4.79575D−07 | −5.54604D−11 | 6.09421D−15 | 0.00000D+00 |
|     |   | ru | D2u | D4u | D6u | D8u | D10 |
| R4s | ⌈ | −2.74448D+01 | 2.98296D−05 | −8.18476D−09 | −8.20907D−13 | −4.37261D−16 | −1.00347D−19 |
|     |   | rl | D21 | D41 | D61 | D81 | D10 |
|     | ⌊ | −2.74448D+01 | 2.98296D−05 | −8.18476D−09 | −8.20907D−13 | −4.37261D−16 | −1.00347D−19 |

In the numerical value example, Ri is the paraxial radius of curvature of the i-th lens surface from the light deflector side, Di is the thickness and air gap of the i-th lens from the light deflector side, and Ni is the refractive index of the material of the i-th lens from the light deflector side. Also, m and s are suffices that respectively indicate the main scanning and sub-scanning directions. Furthermore, the light source wavelength is 675 nm, and the polygonal mirror is an octahedron, which has a circumscribed circle diameter of 65 mm, and an incident deflection angle of 53°.

In Table-3, aspherical coefficients k, Bn, Dn of each order are expressed by relations of a generating line given by relations between the height y and distance x of the lens surface on an x-y plane:

Generating line:

$$X = Y^2/Ru[1+\sqrt{\{1-(y/Ru)^2\}}] + B4uY^4 + B6uY^6 + B8uY^8 + B10uY^{10}$$

(for $Y \geq 0$)

$$X = Y^2/RL[1+\sqrt{\{1-(y/RL)^2\}}] + B4LY^4 + B6LY^6 + B8LY^8 + B10LY^{10}$$

(for $Y < 0$)

and by relations of a meridian line given by the function of lens height:

Meridian line:

$$ru' = ru(1+D2uY^2+D4uY^4+D6uY^6+D8uY^8+D10uY^{10})$$

(for $Y \geq 0$)

$$ru' = rL(1+D2LY^2+D4LY^4+D6LY^6+D8LY^8+D10LY^{10})$$

(for $Y < 0$)

In the laser scanning optical system with such setups, let f2a be the focal length of the toric lens 7 in the main scanning section, and let fa be the focal length of the scanning lens system (synthesized one of the spherical lens 6 and toric lens 7) 11. Then, a laser scanning optical system, which is excellent in wide field angle, high performance, size reduction, environmental resistance variation characteristics of a plastic lens, and cost can be realized by satisfying:

$$0.1 < fa/f2a = 0.3 \quad (1)$$

In the laser scanning optical system of this embodiment, fa/f2a=0.18, which satisfies conditional formula (1) above.

Table-4(A) and Table-4(B) below respectively show the angle, the Fresnel reflectance, and the variation ratio in Fresnel reflectance of a light beam (light rays), which is transmitted through the toric lens 7, at each image height (distance from the scanning center on the surface 8 to be scanned) and at each field angle upon normalization assuming that the on-axis reflectance is unity.

TABLE 4

(A) Toric Lens Fresnel Reflectance

| Image Height (mm) | Field Angle (deg) | Third Surface (deg) | | Fourth Surface (deg) | | In case of p-polarized Laser | | In case of s-polarized Laser | |
|---|---|---|---|---|---|---|---|---|---|
| | | Incident Angle θ3i | Exit Angle θ3o | Incident Angle θ4i | Exit Angle θ4o | Third Surface Reflectance | Fourth Surface Reflectance | Third Surface Reflectance | Fourth Surface Reflectance |
| −145.5 | −30.9 | −3.3 | −2.2 | 2.2 | 3.3 | 0.043 | 0.043 | 0.044 | 0.044 |
| −104.6 | −22.2 | −9.3 | −6.1 | −3.3 | −5.1 | 0.042 | 0.043 | 0.045 | 0.044 |
| 0.0 | 0.0 | 0.2 | 0.1 | −0.1 | −0.2 | 0.043 | 0.043 | 0.043 | 0.043 |
| 111.0 | 23.6 | 9.0 | 5.9 | 2.7 | 4.1 | 0.042 | 0.043 | 0.045 | 0.044 |
| 157.5 | 33.4 | −0.8 | −0.5 | −5.1 | −7.8 | 0.043 | 0.042 | 0.043 | 0.045 |

TABLE 4-continued

| | | (B) Fresnel Reflectance Variation Ratio | | | |
|---|---|---|---|---|---|
| | | In case of p-polarized Laser | | In case of s-polarized Laser | |
| Image Height (mm) | Field Angle (deg) | Third Surface Reflectance | Fourth Surface Reflectance | Third Surface Reflectance | Fourth Surface Reflectance |
| −145.5 | −30.9 | 0.996 | 0.996 | 1.004 | 1.004 |
| −104.6 | −22.2 | 0.965 | 0.990 | 1.035 | 1.010 |
| 0.0 | 0.0 | 1.000 | 1.000 | 1.000 | 1.000 |
| 111.0 | 23.6 | 0.968 | 0.993 | 1.033 | 1.007 |
| 157.5 | 33.4 | 1.000 | 0.975 | 1.000 | 1.025 |

As can be seen from Table-4(A) and Table-4(B), the variation ratio in Fresnel reflectance of each lens surface of the toric lens 7 of this embodiment is 4% or less, and can be improved to approximately ⅓ the conventional variation ratio in reflectance, which exceeds 14%.

As described above, in this embodiment, since the lens shapes of the two lens surfaces of the toric lens 7 are appropriately formed so that the light beam which is transmitted through the toric lens 7 formed of a plastic lens has nearly constant Fresnel reflectance characteristics over the entire scanning angle (entire scanning range), the transmittance of the toric lens 7 can be determined independently of the scanning angle, and the surface to be scanned can be irradiated a substantially uniform light intensity, thus forming a high-quality image.

In this embodiment, at least one surface of the toric lens has an aspherical shape, which is substantially perpendicular to the light beam that has been transmitted through the spherical lens. In addition, the toric lens has a nearly constant thickness (distance between generating lines) in the optical axis direction in the main scanning section. Hence, using such lens shape optimal to injection molding, the optical performance of the molded lens can be improved.

In this embodiment, the toric lens 7 is formed to have a nearly constant thickness (distance between generating lines) in the optical axis direction in the main scanning section in the scanning region.

Note that "nearly constant" in this specification means that the variation ratio in thickness of the toric lens 7 in the optical axis direction in the main scanning section is 20% or less in the scanning region with reference to the central thickness on the axis (lens height=0 mm). Also, the thickness in the optical axis direction means the distance between generating lines in the optical axis direction.

In this embodiment, the distance L from the deflection point position of the light deflector 5 to the surface 8 to be scanned is set to be 1.34 times the paraxial focal length fa of the scanning lens system 11 (L/fa=360.785 mm/270 mm), and this ratio is smaller than 1.43 times (L/fa=269.14 mm/188 mm) in the prior art shown in FIGS. 1 and 2. In this embodiment, since the toric lens 7 is formed to have a nearly constant thickness in the optical axis direction in the main scanning section by appropriately setting this ratio (L/fa), the total lens length of the scanning lens system 11 upon standardization using the paraxial synthesized focal length of the spherical lens 6 and toric lens 7 is shortened, thus realizing a size reduction of the entire apparatus.

Note that the ratio (L/fa)=1.34 is set in this embodiment. However, the present invention is not limited to this. The ratio is preferably set to fall within the range from 1.34 to 1.2.

Figure 5A:
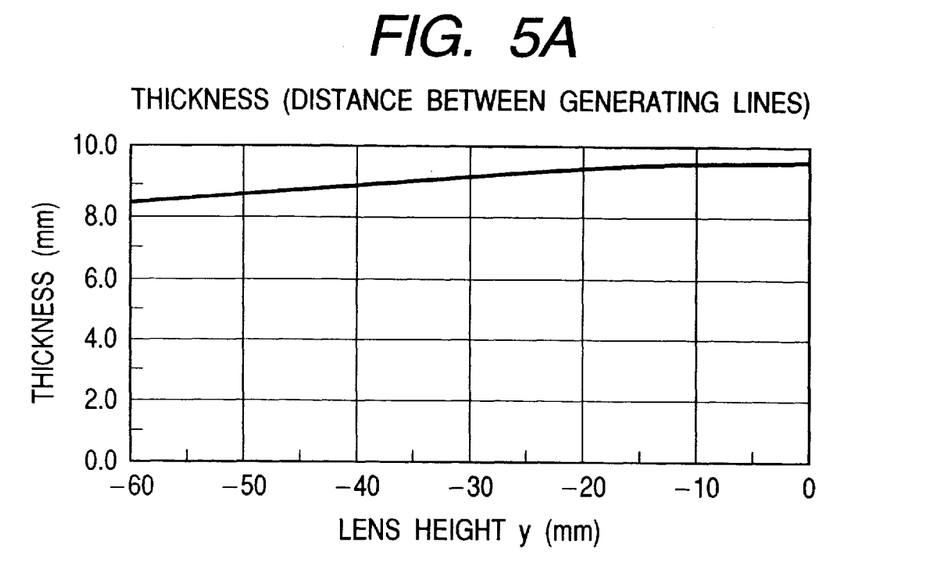
FIGS. 5A and 5B are explanatory views showing the relationship between the lens height and thickness of the first embodiment of the scanning optical system according to the present invention.
Figure 5B:
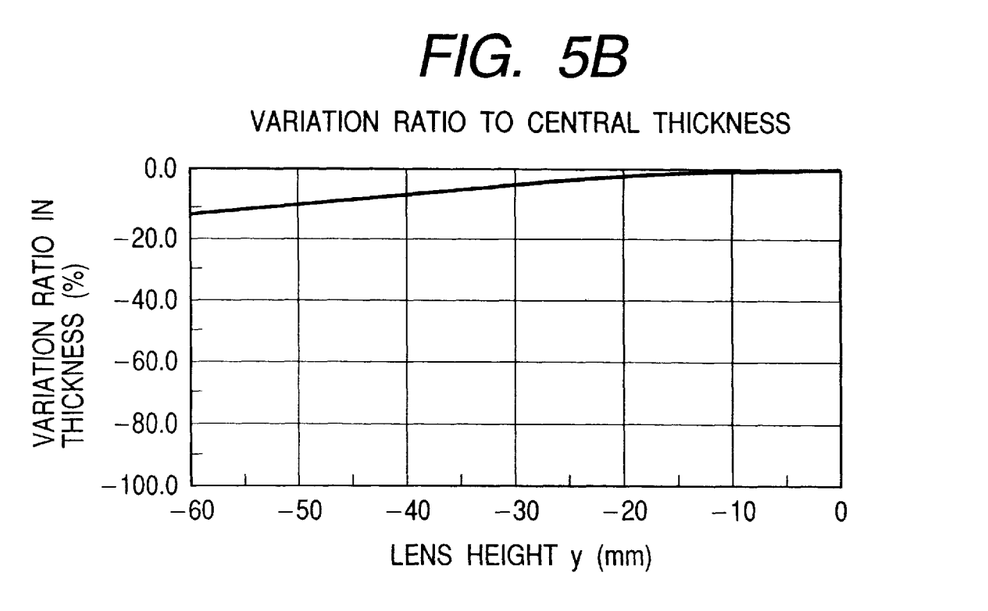

FIGS. 5A and 5B are explanatory views showing the relationship between the lens height y and thickness in the toric lens 7 of this embodiment. As shown in FIGS. 5A and 5B, in this embodiment, since the thickness even at the most off-axis position (lens height=60 mm) is 8.12 mm while the central thickness=9.4 mm, its variation ratio is only 13.8% (1.3 mm) as compared to the central thickness.

In this embodiment, since the toric lens 7 is formed to have a nearly constant thickness in the optical axis direction, as described above, high molding stability is assured, thus achieving low cost by improving the yield, and suppressing the generation of birefringence by relaxing any stress.

In this embodiment, as described above, when this laser scanning optical system is applied to the image forming apparatus such as an LBP or the like, deterioration of image quality can be prevented, and an image having a satisfactory thickness and density of a scanning line can be formed.

Figure 6:
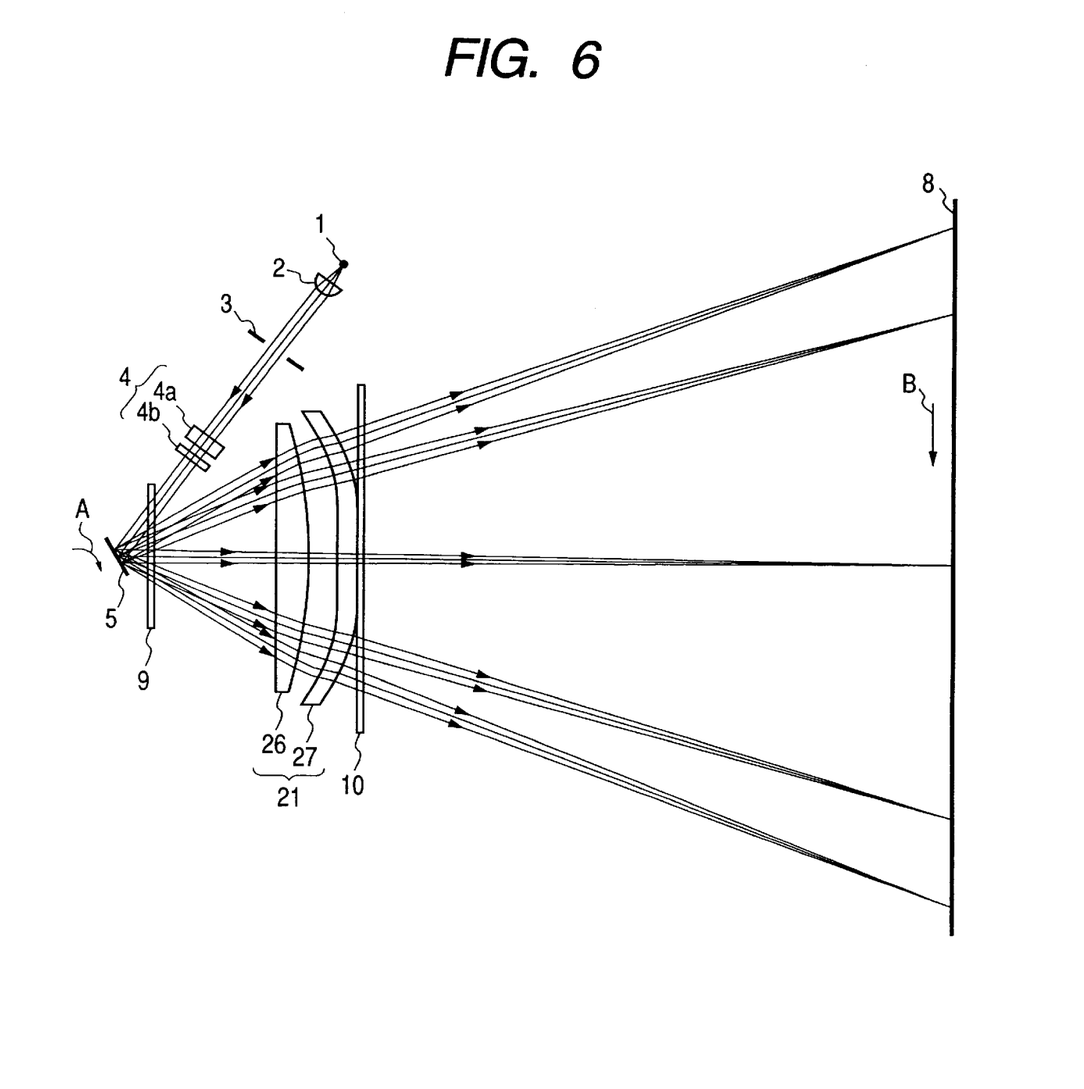
FIG. 6 is a main scanning sectional view of the second embodiment of a scanning optical system according to the present invention.

FIG. 6 is a sectional view in the main scanning direction (main scanning sectional view) when a laser scanning optical system according to the second embodiment of the present invention is applied to an image forming apparatus such as a laser beam printer (LBP) or the like. The same reference numerals in FIG. 6 denote the same parts as those in FIG. 4.

This embodiment is different from the first embodiment mentioned above in that the spherical lens and toric lens are formed to have different lens shapes and, more particularly, to have smaller thicknesses than those in the first embodiment. Other arrangements and optical effects are the same as those in the first embodiment described above, and the same effects can be expected.

That is, a scanning lens system 21 has f-θ characteristics, which has a spherical lens 26, which has a positive refractive power and is formed of a glass material, and a toric lens 27, which is placed on the-surface-to-be-scanned-side of the spherical lens 26, and is formed of a plastic material having a positive refractive power in both the main scanning and sub-scanning directions.

In this embodiment, the thicknesses (distances between generating lines) of the spherical lens 26 and toric lens 27 in the main scanning section are set to be smaller than those in the first embodiment, and the toric lens 27 is formed to have a nearly constant thickness in the optical axis direction in the main scanning section in the scanning region, as in the first embodiment.

Numerical value example 2 of this embodiment is listed below. Note that the light source wavelength is 675 nm, and the polygonal mirror is an octahedron, which has a circumscribed circle diameter of 65 mm, and an incident deflection angle of 53°, as in numerical value example 1 above.

In this embodiment, as in the first embodiment described above, the two lens surfaces of the toric lens 27 are formed by an aspherical shape, which is substantially perpendicular to the light beam (light rays), which is transmitted through the spherical lens 26, in the main scanning section, as described in a numerical value example to be described later, so that the light beam that has been transmitted through the toric lens 27 has nearly constant Fresnel reflectance characteristics over the entire scanning angle (the entire scanning range).

According to the lens shapes of the toric lens 27 of this embodiment, the deflectively reflected light beam (light rays), which has been transmitted through the spherical lens 26, becomes nearly perpendicularly incident on the lens surface of the toric lens 27, and is imaged on a photosensitive drum surface 8 under the influence of its positive refractive power.

Numerical value example 2 of this embodiment is listed below using the aforementioned parameters.

Focal length of scanning lens system: 270 mm

Maximum scanning angle: 64.3°

Polygon center to R1 surface: 100.7 mm

| | |
|---|---|
| R1 = 1010.10 | D1 = 13 |
| | N1 = 1.51329 |
| R2 = −188.84 | D2 = 11.6 |
| R3m = −1643.00 | D3 = 7.5 |
| | N2 = 1.526878 |
| R3s = −67.505 | |
| R4m = −623.068 | D4 = 255.276 |
| R4s = −28.151 | |

Distance from deflection point position to image surface: 360.931 mm

Table-5 below lists aspherical coefficients.

TABLE 5

Table 5 below lists aspherical coefficients.

| | 1 | 2 | 3 | 4 | 5 | 6 |
|---|---|---|---|---|---|---|
| R3m | Ru<br>−1.64300D+03<br>R1<br>−1.64300D+03 | kyu<br>−1.59695D+03<br>ky1<br>6.35060D+01 | B4u<br>−6.39227D−07<br>B41<br>−4.78968D−07 | B6u<br>−6.28600D−11<br>B61<br>−1.64277D−10 | B8u<br>9.69660D−15<br>B81<br>2.96768D−14 | B10<br>−1.44013D−18<br>B10<br>−2.53648D−18 |
| R3s | ru<br>−6.75045D+01<br>r1<br>−6.75045D+01 | D2u<br>0.00000D+00<br>D21<br>0.00000D+00 | D4u<br>0.00000D+00<br>D41<br>0.00000D+00 | D6u<br>0.00000D+00<br>D61<br>0.00000D+00 | D8u<br>0.00000D+00<br>D81<br>0.00000D+00 | D10<br>0.00000D+00<br>D10<br>0.00000D+00 |
| R4m | Ru<br>−6.23068D+02<br>R1<br>−6.23068D+02 | kyu<br>−1.55043D+00<br>ky1<br>−2.05595D+02 | B4u<br>−5.32168D−07<br>B41<br>−5.30889D−07 | B6u<br>−6.53181D−11<br>B61<br>−1.19881D−10 | B8u<br>1.00333D−14<br>B81<br>2.07908D−14 | B10<br>−1.36880D−18<br>B10<br>−1.83334D−18 |
| R4s | ru<br>−2.81509D+01<br>r1<br>−2.81509D+01 | D2u<br>2.83666D−05<br>D21<br>3.11124D−05 | D4u<br>−9.67696D−09<br>D41<br>−1.10043D−08 | D6u<br>2.70159D−12<br>D61<br>3.19037D−12 | D8u<br>−9.80021D−17<br>D81<br>−1.50495D−16 | D10<br>0.00000D+00<br>D10<br>0.00000D+00 |

In the laser scanning optical system of this embodiment, $fa/f2a=0.14$, which satisfies conditional formula (1) above.

Table-6(A) and Table-6(B) below respectively show the angle, the Fresnel reflectance, and the variation ratio in Fresnel reflectance of a light beam (light rays), which is transmitted through the toric lens 27, at each image height (distance from the scanning center on the surface 8 to be scanned) and at each field angle upon normalization assuming that the on-axis reflectance is unity:

TABLE 6

(A) Toric Lens Fresnel Reflectance

| | | Third Surface (deg) | | Fourth Surface (deg) | | In case of p-polarized Laser | | In case of s-polarized Laser | |
|---|---|---|---|---|---|---|---|---|---|
| Image Height (mm) | Field Angle (deg) | Incident Angle $\theta_{3i}$ | Exit Angle $\theta_{3o}$ | Incident Angle $\theta_{4i}$ | Exit Angle $\theta_{4o}$ | Third Surface Reflectance | Fourth Surface Reflectance | Third Surface Reflectance | Fourth Surface Reflectance |
| −145.5 | −30.9 | 2.1 | 1.4 | 4.7 | 7.2 | 0.043 | 0.043 | 0.044 | 0.044 |
| −104.6 | −22.2 | −7.9 | −5.2 | −3.0 | −4.6 | 0.042 | 0.043 | 0.045 | 0.044 |
| 0.0 | 0.0 | 0.0 | 0.0 | 0.0 | −0.1 | 0.043 | 0.043 | 0.043 | 0.043 |
| 111.0 | 23.6 | 6.1 | 4.0 | 1.5 | 2.3 | 0.043 | 0.043 | 0.044 | 0.044 |
| 157.5 | 33.4 | −8.2 | −5.4 | −8.9 | −13.6 | 0.042 | 0.040 | 0.045 | 0.047 |

TABLE 6-continued

(B) Fresnel Reflectance Variation Ratio

| | | In case of p-polarized Laser | | In case of s-polarized Laser | |
| --- | --- | --- | --- | --- | --- |
| Image Height (mm) | Field Angle (deg) | Third Surface Reflectance | Fourth Surface Reflectance | Third Surface Reflectance | Fourth Surface Reflectance |
| −145.5 | −30.9 | 0.998 | 0.979 | 1.002 | 1.021 |
| −104.6 | −22.2 | 0.975 | 0.992 | 1.025 | 1.008 |
| 0.0 | 0.0 | 1.000 | 1.000 | 1.000 | 1.000 |
| 111.0 | 23.6 | 0.985 | 0.998 | 1.015 | 1.002 |
| 157.5 | 33.4 | 0.973 | 0.926 | 1.027 | 1.077 |

As can be seen from Table-6(A) and Table-6(B), the variation ratio in Fresnel reflectance of each lens surface of the toric lens 27 of this embodiment is 8% or less over the entire scanning range, and can be improved to approximately ½ the conventional variation ratio in reflectance, which exceeds 14%.

In this way, according to this embodiment, since the lens shapes of the two lens surfaces of the toric lens 27 are appropriately formed so that the light beam which is transmitted through the toric lens 27, comprised of a plastic lens, has nearly constant Fresnel reflectance characteristics over the entire scanning angle (entire scanning range), a system which is further excellent in size reduction, cost, and environmental-resistance-variation characteristics can be provided. Also, since the thickness of the toric lens 27 can be further reduced, production of birefringence can be suppressed, and imaging performance in the sub-scanning direction can be improved.

In this embodiment, the distance L from the deflection point position of a light deflector 5 to the surface 8 to be scanned is set to be 1.34 times the paraxial focal length fa of the scanning lens system 21 (L/fa=360.931 mm/270 mm), and this ratio is smaller than 1.43 times (L/fa=269.14 mm/188 mm) in the prior art shown in FIGS. 1 and 2. In this embodiment, since the toric lens 27 is formed to have a nearly constant thickness in the optical axis direction in the main scanning section by appropriately setting this ratio (L/fa), the total lens length of the scanning lens system 21 upon standardization using the paraxial synthesized focal length of the spherical lens 26 and toric lens 27 is shortened, thus realizing a size reduction of the entire apparatus.

Figure 7A:
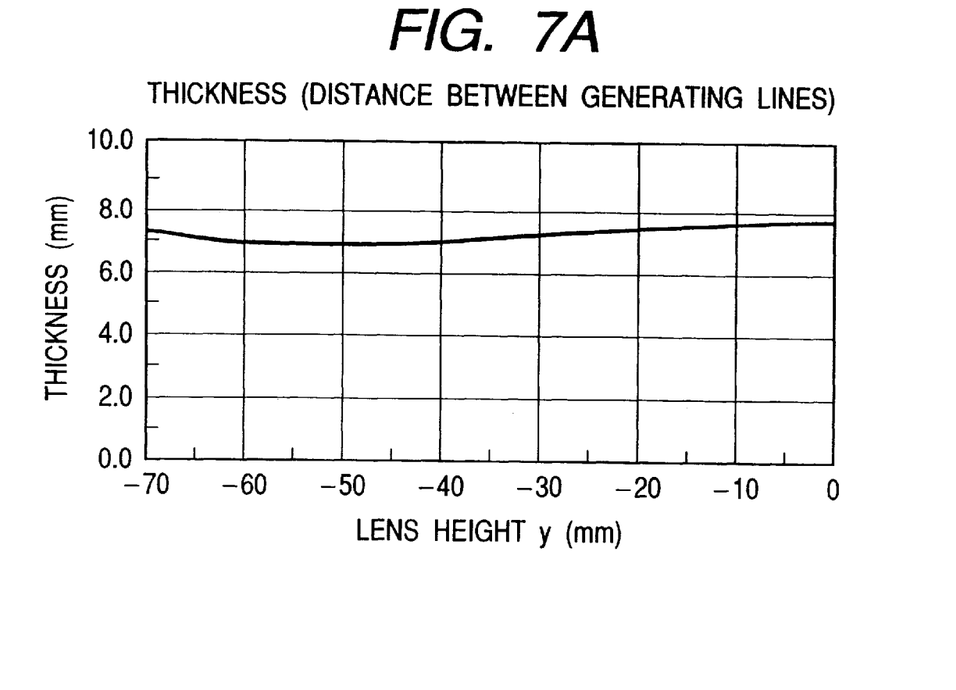
FIGS. 7A and 7B are explanatory views showing the relationship between the lens height and thickness of the second embodiment of the scanning optical system according to the present invention.
Figure 7B:
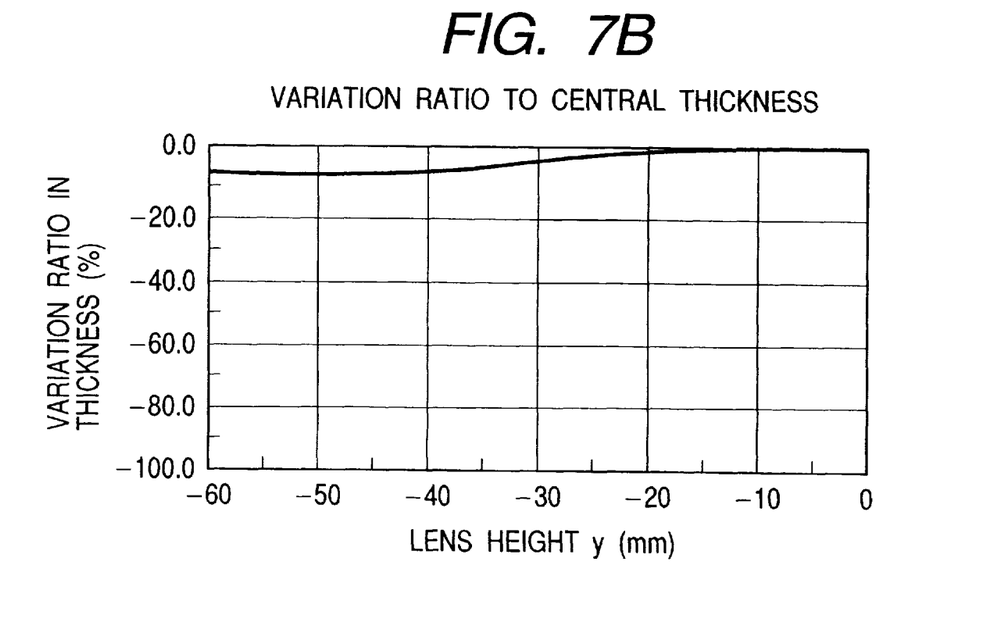

FIGS. 7A and 7B are explanatory views showing the relationship between the lens height y and thickness in the toric lens 27 of this embodiment. As shown in FIGS. 7A and 7B, in this embodiment, since the thickness even at the position of the lens height=60 mm is 6.8 mm while the central thickness 7.4 mm, its variation ratio is only 9.3% (0.7 mm) as compared to the central thickness.

Especially, in this embodiment, since the thickness variation ratio is further smaller than that in the first embodiment, a sufficiently large edge thickness can be assured even when the central thickness becomes small. Hence, a lens shape effective as a measure against birefringence can be obtained.

In this way, according to this embodiment, since the toric lens 27 is appropriately formed to have a nearly constant thickness in the optical axis direction in the main scanning section, a system which is further excellent in size reduction, cost, and environmental resistance variation characteristics can be provided. In addition, imaging performance in the sub-scanning direction can be improved.

To restate, according to the present invention, since at least one lens surface of the toric lens formed of a plastic material has an aspherical shape, which is nearly perpendicular to the light beam which has been transmitted through the spherical lens, in the main scanning section, a laser scanning optical system, which can prevent image deterioration resulting from changes in reflectance characteristics, and can irradiate the surface to be scanned at substantially uniform light intensity (energy strength), can be realized.

Also, according to the present invention, since the toric lens made from a plastic material is formed to have a nearly constant thickness (distance between generating lines) in the optical axis direction in the main scanning section, a laser scanning optical system, which can suppress production of birefringence by achieving low cost by improving the yield, and by relaxing any stress, and can scan a satisfactorily imaged spot on the surface scanned, can be realized.

When an image is formed using the aforementioned laser scanning optical system, an image forming apparatus which can reduce image quality deterioration, and can form an image having a satisfactory thickness and density of a scanning line, can be realized.

What is claimed is:

1. A laser scanning optical system comprising:
   light source means;
   deflection means for deflecting a light beam emitted by said light source means; and
   a scanning lens system for guiding the light beam deflectively reflected by said deflection means to a surface to be scanned, said scanning lens system having a spherical lens, and a toric lens which is formed of a plastic material having a positive refractive power in both main scanning and sub-scanning directions, and
   wherein in the main scanning direction, at least one surface of said toric lens has an aspherical shape and the incident angle and exit angle of the light beam at an end point of a scanning range to said lens surface is not greater than 13.6°.

2. A system according to claim 1, wherein the lens surface having the aspherical shape of said toric lens has substantially constant Fresnel reflectance characteristics over an entire scanning range.

3. A system according to claim 1, wherein said spherical lens has a positive refractive power.

4. A system according to claim 1, wherein said spherical lens is formed of a glass material.

5. A system according to claim 1, wherein a variation ratio in Fresnel reflectance of the lens surface having the aspherical shape of said toric lens over an entire scanning range is not more than 10%.

6. A system according to claim 1, wherein a thickness of said toric lens in an optical axis direction in the main scanning section is substantially constant.

7. A system according to claim 1, wherein a ratio of a distance from a deflection point of said deflection means to the surface to be scanned to a focal length of said scanning lens system falls within a range from 1.34 to 1.2.

8. A system according to claim 1, wherein a variation ratio in thickness of said toric lens in an optical axis direction in the main scanning section is not more than 20% in a scanning region with reference to a central thickness on an axis.

9. An image forming apparatus comprising:

light source means;

deflection means for deflecting a light beam emitted by said light source means;

a recording medium; and a scanning lens system for guiding the light beam defectively reflected by said deflection means to a surface of said recording medium, said scanning lens system having a spherical lens, and a toric lens which is formed of a plastic material having a positive refractive power in both main scanning and sub-scanning directions, and wherein in the main scanning direction, at least one surface of said toric lens has an aspherical shape and the incident angle and exit angle of the light beam at an end point of a scanning range to said lens surface is not greater than 13.6°.

10. An apparatus according to claim 9, wherein the lens surface having the aspherical shape of said toric lens has substantially constant Fresnel reflectance characteristics over an entire scanning range.

11. An apparatus according to claim 9, wherein said spherical lens has a positive refractive power.

12. An apparatus according to claim 9, wherein said spherical lens is formed of a glass material.

13. An apparatus according to claim 9, wherein a variation ratio in Fresnel reflectance of the lens surface having the aspherical shape of said toric lens over an entire scanning range is not more than 10%.

14. An apparatus according to claim 9, wherein a thickness of said toric lens in an optical axis direction in the main scanning section is substantially constant.

15. An apparatus according to claim 9, wherein a ratio of a distance from a deflection point of said deflection means to the surface to be scanned to a focal length of said scanning lens system falls within a range from 1.34 to 1.2.

16. An apparatus according to claim 9, wherein a variation ratio in thickness of said toric lens in an optical axis direction in the main scanning section is not more than 20% in a scanning region with reference to a central thickness on an axis.

17. A laser scanning optical system according to claim 1, wherein in the aspherical-shaped lens surface of said toric lens, the generating line is expressed by the following equations in relation with a height y and a distance x of the lens surface, when aspherical coefficients of each order are expressed by Bnu, BnL where n=4,6,8,10, $$X = Y^2/Ru[1+\sqrt{\{1-(y/Ru)^2\}}] + B4uY^4 + B6uY^6 + B8uY^8 + B10uY^{10}$$

(for $Y \geq 0$)

$$X = Y^2/RL[1+\sqrt{\{1-(y/RL)^2\}}] + B4LY^4 + B6LY^6 + B8LY^8 + B10LY^{10}$$

(for $Y < 0$)

and wherein the center of curvature of said lens surface exists in a deflection means side and the aspherical coefficients B4u and B4L of the fourth order and B6u and B6L of the sixth order have the same sign as that of the curvature R of the lens surface on the on-axis.

18. An image forming apparatus according to claim 9, wherein in the aspherical-shaped lens surface of said toric lens, the generating line is expressed by the following equations in relation with a height y and a distance x of the lens surface, when aspherical coefficients of each order are expressed by Bnu, BnL where n=4,6,8,10, $$X = Y^2/Ru[1+\sqrt{\{1-(y/Ru)^2\}}] + B4uY^4 + B6uY^6 + B8uY^8 + B10uY^{10}$$

(for $Y \geq 0$)

$$X = Y^2/RL[1+\sqrt{\{1-(y/RL)^2\}}] + B4LY^4 + B6LY^6 + B8LY^8 + B10LY^{10}$$

(for $Y < 0$)

and wherein the center of curvature of said lens surface exists in a deflection means side and the aspherical coefficients B4u and B4L of the fourth order and B6u and B6L of the sixth order have the same sign as that of the curvature R of the lens surface on the on-axis.

* * * * *

UNITED STATES PATENT AND TRADEMARK OFFICE
CERTIFICATE OF CORRECTION

PATENT NO. : 6,104,520
DATED : August 15, 2000
INVENTOR(S) : Takeshi Yamawaki

It is certified that error appears in the above-identified patent and that said Letters Patent is hereby corrected as shown below:

Title page,
Item [56], The Attorney, Agent, or Firm: "Fitzpatric, Cella, Harper & Scinto" should read -- Fitzpatrick, Cella, Harper & Scinto --.

Column 1,
Line 15, "laser" should read -- laser, --; and "using-a" should read -- using a --.
Line 22, "proposed" should be deleted.

Column 2,
Line 38 should read -- Table 1 below lists aspherical coefficients. --.
Table 1,"Table 1 below lists aspherical coefficients." should be deleted.

Column 5,
Line 31, "effect" should read -- have effect --.

Column 6,
Line 39, "a ratio" should read -- the ratio --.

Column 8,
Line 57 should read -- Table 3 below lists aspherical coefficients. --.
Table 3,"Table 3 below lists aspherical coefficients." should be deleted.

Column 11,
Line 30, "a" should read -- at a --.

Column 14,
"Table 5 below lists aspherical coefficients." should be deleted.

Signed and Sealed this

Fourth Day of December, 2001

Attest:

NICHOLAS P. GODICI
Acting Director of the United States Patent and Trademark Office

*Attesting Officer*